United States Patent [19]
Dowling et al.

[11] 3,715,655
[45] Feb. 6, 1973

[54] INDUCTION LOGGING APPARATUS HAVING A COMMON SERIES ELEMENT FOR NULLING

[75] Inventors: Donald J. Dowling; George R. Atwood, both of Houston, Tex.

[73] Assignee: Texaco Inc., New York, N.Y.

[22] Filed: Dec. 30, 1970

[21] Appl. No.: 102,749

[52] U.S. Cl. .................................................. 324/6
[51] Int. Cl. ............................. G01v 3/10, G01v 3/18
[58] Field of Search .............................. 324/2, 6, 4

[56] References Cited

UNITED STATES PATENTS

| | | | |
|---|---|---|---|
| 3,147,429 | 9/1964 | Moran | 324/6 |
| 3,065,407 | 11/1962 | Huddleston et al. | 324/6 |
| 3,471,772 | 10/1969 | Smith | 324/3 |
| 2,788,483 | 4/1957 | Doll | 324/6 |
| 2,220,070 | 11/1940 | Aiken | 324/6 |
| 2,731,596 | 1/1956 | Wait et al. | 324/6 |

*Primary Examiner*—Gerard R. Strecker
*Attorney*—Thomas H. Whaley and Carl G. Ries

[57] ABSTRACT

Induction logging apparatus employing a transmitter coil with a receiver coil spaced therefrom along a common axis. It has an excitation circuit for the transmitter coil and an output circuit for signals induced in the receiver coil, thus a common circuit for nulling the direct coupled receiver signals. All three of the circuits are located on a logging sonde that may be run down a well.

2 Claims, 4 Drawing Figures

PATENTED FEB 6 1973 3,715,655

INDUCTION LOGGING APPARATUS HAVING A COMMON SERIES ELEMENT FOR NULLING

BACKGROUND OF THE INVENTION

1. Field of the Invention

This invention concerns deep well logging in general, and more specifically relates to induction type logging apparatus.

2. Description of the Prior Art

In induction logging apparatus, there are problems which relate to the major requirement that stems from the need to overcome direct induction voltage as developed in the receiver coil. Such direct voltage is due to the coupling from the transmitter coil when both are located in air, i.e., without outside influence, such as the walls of a borehole.

There have been various kinds of approach to this problem of reducing the direct coupling signal. It is imperative to do so in order to have the remaining signal voltages dependent upon the formation parameters only, when the logging tool is in a borehole. Otherwise, the direct coupling signal will mask the desired formation signals completely.

One approach for reducing this direct coupling induced voltage is that of providing a bucking voltage having equal and opposite magnitude. However, in prior attempts at developing such a bucking voltage, it has been found that the bucking voltage must be extremely stable in order to be sure that the signals developed are due to formation parameter conditions and not variations in the bucking voltage. Consequently, attempts to develop such stability have involved costly and complicated equipment. Furthermore, the degree of stability required has often exceeded the state of the art so that it could not be achieved.

Another approach used heretofore has been the provision of a receiver nulling coil that is connected in opposition to the principal receiver coil. However, because the nulling receiver coil is usually located closer to the transmitter coil than is the principal receiver coil, the voltage developed in the nulling coil is more temperature dependent than the voltage in the principal receiver coil. Therefore the output signals will experience temperature drift.

In order to overcome the prior difficulties, it is an object of this invention to provide logging apparatus that includes a source of bucking voltage which is common to both the transmitter exitation circuit and the receiver output circuit so that any variations in transmitter supply are reflected equally in the receiver output.

SUMMARY OF THE INVENTION

Briefly, the invention concerns deep well induction logging apparatus which has a sonde to be run in a well. Such apparatus comprises in combination (a) a transmitter coil on said sonde having an axis, and (b) a receiver coil on said sonde and having an axis in common with said transmitter coil axis. It also comprises (c) excitation circuit means on said sonde for connecting energization to said transmitter coil, and (d) output circuit means on said sonde for carrying output signals from said receiver coil dependent upon formation conditions surrounding said well. It also comprises (e) circuit means on said sonde in common with said excitation and said output circuits for causing a bucking signal to eliminate undesired direct coupled signals from said output circuit.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

As has already been indicated above, the requirements for induction well logging are difficult and exacting since the signals of interest that are created by reason of formation changes, are quite small in amplitude and therefore are easily masked or distorted. Consequently, interpretation of a logging run becomes difficult and sometimes unreliable. The basic problem is that of eliminating from the receiver coil those signals caused by direct induction coupling from the transmitter coil.

Induction logging systems in their simplest form use two coils, one of which is supplied with a source of alternating current. Ideally, the supply has a fixed frequency and unvarying current level. The second coil located nearby and on a common axis, has a voltage induced in it which is dependent upon many factors including the surrounding earth formations. It is the effect of the earth formations surrounding the logging sonde which provides the desired signals for measurement.

The voltage induced in the second (or receiver) coil because of the earth formations is relatively very small compared to the voltage induced because of the direct coupling between the first (or transmitter) coil and receiver coil. Therefore, it is customary in order to sense the earth formation-caused voltage changes, to provide a "bucking voltage" of a magnitude equal to that from the direct coupling between the transmitter and receiver coils. This bucking voltage is then connected to the receiver coil in such a way as to "buck out" the direct coupled voltage in the receiver coil. The voltage remaining is then the desired earth-formation-effect voltage.

In practice the bucking voltage must be a very stable one in order that it not contribute voltage variations which might be erroneously interpreted as valid signal voltages (due to earth formations). And, it has been found that a complex, bulky and expensive system is required in order to provide such a source of stable bucking voltage.

In addition, the direct-coupled voltage induced in the receiver coil should also be of a constant value in order that it be bucked out without variations which might be erroneously interpreted as valid signal voltages. In order to meet this condition, a requirement is that the transmitter coil excitation current be constant. While constant current sources are well known in the art, stability requirements in such a use as this demand constant current sources on the order of 0.1 parts per million per degree Centigrade, which is presently beyond the state of the art.

Figure 1:
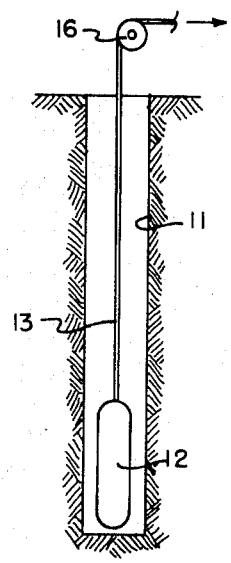
FIG. 1 is a schematic illustration showing a well logging sonde in a well for carrying out a logging run.

With reference to FIG. 1, it will be noted that conventional induction logging procedure involves running in a well 11, a logging sonde 12 that may be suspended from a cable 13 which supports the sonde and also carries electrical circuit connections from the sonde to the surface. The cable runs over a pulley 16, as is indicated. It is located at the surface for use in raising and lowering the sonde 12 in the well.

The physical structure of the electrical coils on sonde 12 may take various forms depending upon the size and arrangement for obtaining penetration into the walls of the well 11. However, such features for no part, per se, of this invention. As indicated above, the invention relates to electrical circuits such that a bucking signal is obtained by having a common circuit between the transmitter coil energizing circuit, and the receiver coil output circuit.

Figure 2:
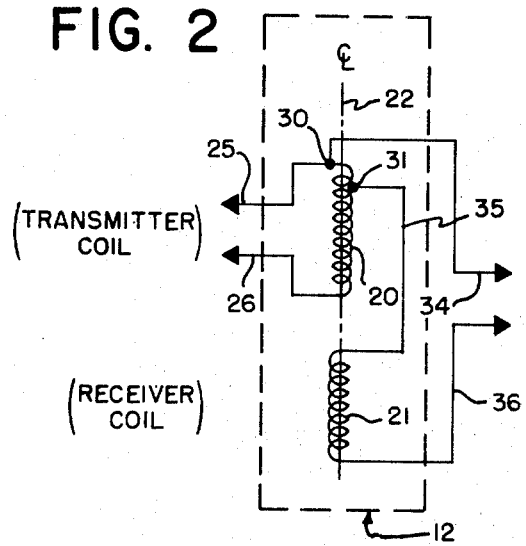
FIG. 2 is a schematic circuit diagram illustrating one embodiment of a circuit according to the invention.

One modification for carrying out the invention is illustrated in FIG. 2. There is a transmitter coil 20 that has a common axis with a receiver coil 21. This is indicated by a center line 22 which is common to both transmitter and receiver coils 20 and 21.

The transmitter coil 20 receives energizing signals, or current flow over a pair of circuit wires 25 and 26 which lead to the two ends of the coil 20. Then, in order to provide a desired bucking voltage for the output circuit, there is a tap 30 at one end of the coil 20 and another tap 31 a few turns from that end of the coil.

The output circuit that includes receiver coil 21 also includes a circuit wire 34 that connects to the tap 30. Then, from the tap 31 there is another circuit wire 35 that leads to one end of the receiver coil 21. The other end of receiver coil 21 is connected back to the other side of the receiver output circuit via a circuit wire 36.

It will be appreciated that the foregoing circuit arrangement will be designed and adjusted, as the locating sonde is constructed, so that the bucking voltage (as tapped off from one end of the transmitter coil 20) will be equal and opposite to the induced voltage in receiver coil 21, which is due to direct coupling from the transmitter coil 20 when the sonde is in air and uninfluenced by any other substance, e.g., by the borehole walls.

Figure 3:
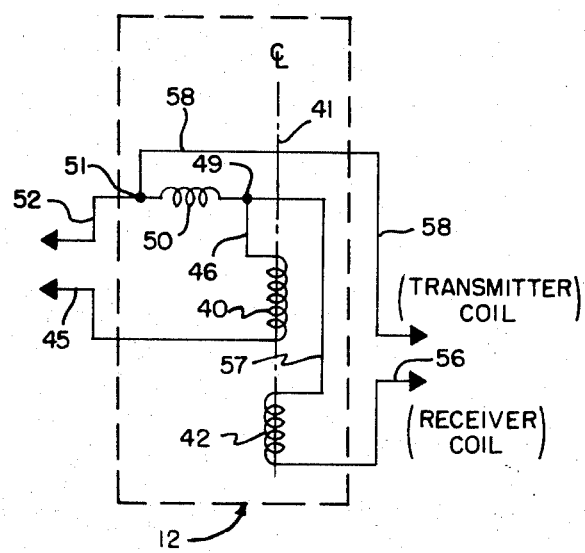
FIG. 3 is another schematic circuit diagram illustrating a different embodiment of a circuit according to the invention.

FIG. 3 illustrates another modification, wherein there is a transmitter coil 40 on a common axis or center line 41 with a receiver coil 42. The exitation circuit for transmitter coil 40 includes a circuit wire 45 that connects to one end of the coil, plus a wire 46 that is connected to the other end of the coil. The wire 46 goes to a circuit connection point 49 which also has connected thereto one end of an auxiliary inductance coil 50. The other end of coil 50 is connected to a circuit connection point 51 to which there is also connected a circuit wire 52 that completes the transmitter coil energization circuit.

The receiver coil 42 is connected in an output signal circuit. It includes a circuit wire 56 that goes to one end of the coil 42 and another circuit wire 57 that connects the other end of the coil to the circuit connection point 49. The output signal circuit continues via the auxiliary coil 50 and circuit connection point 51 to another circuit wire 58 that leads back to the other side of the circuit.

It will be noted that this modification provides for a bucking voltage which is developed in an auxiliary coil 50. It is in common with the transmitter coil exitation circuit and the receiver coil output signal circuit. Consequently, this bucking voltage provides the benefits of automatic cancellation of variations in exitation voltages or current flow in the transmitter coil circuit. And, such cancellation is provided in the receiver output signal circuit directly.

Figure 4:
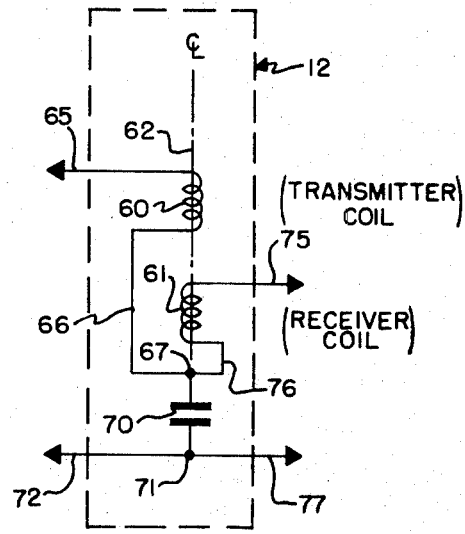
FIG. 4 is another schematic circuit diagram illustrating a third embodiment of a circuit according to the invention.

FIG. 4 illustrates a third embodiment of the invention, wherein the sonde coil structure includes a transmitter coil 60 and a receiver coil 61, both located with a common axis, as indicated by a center line 63.

The energization circuit for transmitter coil 60 includes a circuit wire 65 that connects to one end of the coil and another circuit wire 66 that goes from the other end of transmitter coil 60 to a circuit connection point 67. Then from the connection point 67 there is a circuit connection to one side of a capacitor 70 that has the other side thereof connected to a circuit connection point 71. Finally, there is circuit wire 72 that also connects to the point 71 and completes the transmitter coil energization circuit.

The receiver coil 61 is connected into the output signal circuit by means of a circuit connection wire 75 that goes to one end of the coil 61. The other end of the coil 61 is connected via a wire 76 to the circuit connection point 67. Then the output signal circuit continues from connection point 67 via the capacitor 70 to the circuit connection point 71, and from there it is completed over a circuit wire 77.

It will be understood that the circuit constants for the system illustrated in FIG. 4 should be such that the capacitive reactance voltage drop across capacitor 70, in the transmitter coil energization circuit, will be equal and opposite to the direct coupled induction signal developed in receiver coil 61 when the logging sonde is in air. Consequently, any signal variations that develop when the locating sonde is being run in a well, are those due to formation parameters and not to undesired influences such as voltage variations of any sort in the transmitter supply circuit.

In addition, it should be observed that the capacitor 70 is constructed so as to have a zero temperature coefficient. Therefore, the capacitor 70 will be insensitive to temperature changes and will not develop any change in its capacitance when temperature changes are encountered, as is often the case in deep well logging. Thus, no temperature drift signals will appear to cause possible erroneous interpretations.

It will be appreciated that the circuit diagrams are no more than that, and they do not indicate any design parameters such as number of turns or physical spacing between coils, etc. The fact that these coils are located on a logging sonde is schematically indicated by the dashed line rectangle that has the reference number of the sonde 12 applied thereto.

While the foregoing particular embodiments of the invention have been described in considerable detail in accordance with the applicable statutes, this is not to be taken as in any way limiting the invention, but merely as being descriptive thereof.

We claim:

1. An induction logging tool comprising in combination an elongated sonde having a cable attached thereto for running said sonde in a well, a transmitter coil carried by said sonde and having an axis, a receiver coil carried by said sonde and being located spaced from said transmitter coil longitudinally along said axis, said receiver coil having an axis located in common with said transmitter coil axis, an excitation circuit for energizing said transmitter coil including a capacitive reactance element in series with said transmitter coil, and an output signal circuit for carrying signals from said receiver coil dependent upon formation conditions surrounding said well, and including said capacitive reactance element in series with said receiver coil, said capacitive reactance element being common to both said excitation and output signal circuits for causing a bucking signal to eliminate undesired direct coupled signals from said output circuit.

2. An induction logging tool according to claim 1 wherein said capacitive reactance is temperature insensitive.

* * * * *